United States Patent
Sakurai et al.

(10) Patent No.: US 7,427,891 B2
(45) Date of Patent: Sep. 23, 2008

(54) CHARGE PUMP-TYPE BOOSTER CIRCUIT

(75) Inventors: Atsushi Sakurai, Chiba (JP); Yutaka Sato, Chiba (JP)

(73) Assignee: Seiko Instruments Inc., Chiba (JP)

( * ) Notice: Subject to any disclaimer, the term of this patent is extended or adjusted under 35 U.S.C. 154(b) by 22 days.

(21) Appl. No.: 11/709,915

(22) Filed: Feb. 22, 2007

(65) Prior Publication Data

US 2007/0273431 A1    Nov. 29, 2007

(30) Foreign Application Priority Data

Feb. 22, 2006    (JP) ............................. 2006-044818

(51) Int. Cl.
*G05F 1/10*    (2006.01)
(52) U.S. Cl. .................................... 327/536
(58) Field of Classification Search ............... 327/535, 327/536, 537
See application file for complete search history.

(56) References Cited

U.S. PATENT DOCUMENTS

| | | | | |
|---|---|---|---|---|
| 5,889,428 A | * | 3/1999 | Young | .................. 327/536 |
| 6,046,626 A | * | 4/2000 | Saeki et al. | .................. 327/536 |
| 6,292,048 B1 | * | 9/2001 | Li | .................. 327/536 |
| 6,535,052 B2 | * | 3/2003 | Myono | .................. 327/536 |
| 6,970,035 B2 | * | 11/2005 | Tanimoto | .................. 327/536 |
| 7,123,077 B2 | * | 10/2006 | Chiu et al. | .................. 327/536 |
| 2002/0130704 A1 | | 9/2002 | Myono et al. | |

OTHER PUBLICATIONS

Wu, et al., "MOS Charge Pumps for Low-Voltage Operation", IEEE Journal of Solid-State Circuits, vol. 33, No. 4, Apr. 1998.

* cited by examiner

*Primary Examiner*—Jeffrey S Zweizig
(74) *Attorney, Agent, or Firm*—Brinks Hofer Gilson & Lione (57) ABSTRACT

Provided is a charge pump circuit whose power efficiency is not reduced even when a threshold voltage of a transistor is increased by a substrate effect with an increase in the number of stages. A depletion transistor is used as an N-channel transistor included in an inverter of a high-voltage clock generating circuit. A P-channel enhancement transistor is used as a charge transfer device.

5 Claims, 7 Drawing Sheets

CHARGE PUMP-TYPE BOOSTER CIRCUIT

This application claims priority under 35 U.S.C. §119 to Japanese Patent Application No. JP2006-044818 Feb. 22, 2006, the entire content of which is hereby incorporated by reference.

FIELD OF THE INVENTION

The present invention relates to a charge pump circuit used for an electronic device and the like, and more particularly, to a charge pump circuit having improved boosting efficiency.

DESCRIPTION OF THE RELATED ART

A current electronic device includes a plurality of ICs provided therein in order to achieve a function thereof. The ICs are normally operated at different voltages and require a plurality of constant voltage sources different from a power source voltage source. A switching regulator or a charge pump circuit is used as each of the constant voltage sources.

The switching regulator can generate a predetermined voltage at high power efficiency (output power/input power). However, this circuit has a disadvantage that it generates a harmonic noise at the time of current switching, so it is necessary to use a shielded power source circuit. In addition, a coil is required as an external part, with the result that the size reduction is limited. On the other hand, the charge pump circuit can generate a high voltage with a small noise but has a disadvantage that power efficiency is low.

Figure 4:
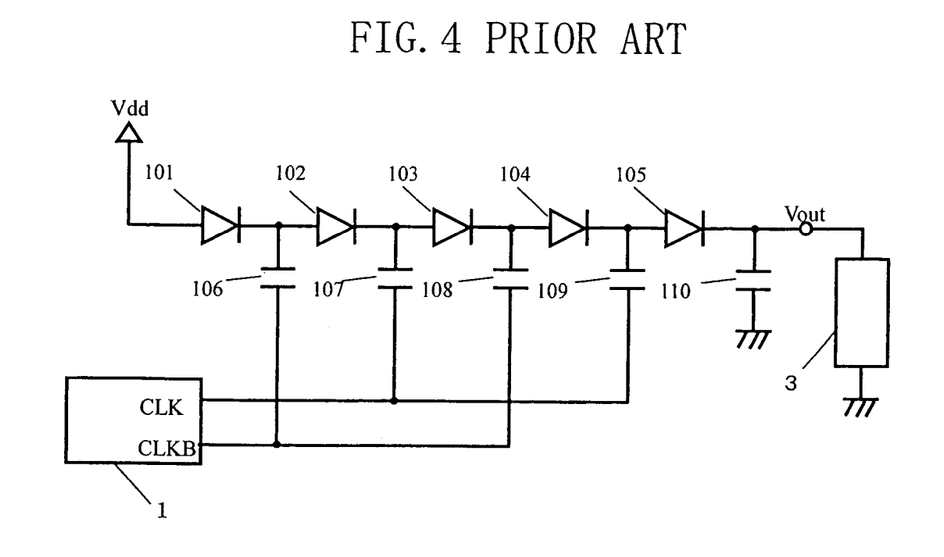
FIG. 4 is a diagram showing a conventional four-stage Dickson charge pump circuit.

A Dickson charge pump circuit is known as a fundamental charge pump circuit. FIG. 4 is a circuit diagram showing a four-stage Dickson charge pump circuit. In FIG. 4, five diodes 101 to 105 are connected in series. Reference numerals 106 to 109 denote coupling capacitors, reference numeral 110 denotes an output capacitor, and reference symbols CLK and CLKB denote input clock pulses whose phases are reversed to each other. Reference numeral 1 denotes a clock driver and 3 denotes a load.

When a constant current Iout flows into the load 3 in a stable state, a current inputted to the charge pump circuit corresponds to a current based on an input voltage Vdd and a current supplied from the clock driver 1. The currents behave as follows in the case where a charge and discharge current to a parasitic capacitor is neglected. During a period in which a clock pulse CLK is in an H (high) level and a clock pulse CLKB is in an L (low) level, an average current of 2Iout flows in a direction indicated by a solid line arrow of this figure. During a period in which the clock pulse CLK is in an L (low) level and the clock pulse CLKB is in an H (high) level, the average current of 2Iout flows in a direction indicated by a dotted line arrow of FIG. 4. Each of the average currents during a clock period is Iout. A boosting voltage Vout of the charge pump circuit in the stable state is expressed as follows.

$$Vout = Vin - Vd + n(V_\phi' - V1 - Vd) \quad \text{(Equation 1)}$$

Here, $V_\phi'$ indicates an amplitude of a voltage caused by a coupling capacitor based on a change in clock pulse at each connection node. In addition, V1 indicates voltage drop caused by the output current Iout, and Vin indicates the input voltage which is normally set to the power source voltage Vdd in the case of positive boosting and set to 0 V in the case of negative boosting. Further, Vd indicates a forward bias diode voltage and n indicates the number of pumping steps. Furthermore, V1 and $V_\phi'$ are expressed by the following expressions.

$$V1 = \frac{Iout}{f(C+C_s)} = \frac{2Iout/2}{C+C_s} \quad \text{(Equation 2)}$$

$$V_\phi' = V\phi \frac{C}{C+C_s} \quad \text{(Equation 3)}$$

Here, C indicates a clock coupling capacitance, $C_s$ indicates a parasitic capacitance at each connection node, $V_\Theta$ indicates a clock pulse amplitude, f indicates a clock pulse frequency, and T indicates a clock period. When the charge and discharge current flowing from the clock driver 1 to the parasitic capacitor is neglected and Vin is equal to Vdd, the power efficiency of the charge pump circuit is expressed by the following expression.

$$\eta(\%) = \frac{Vout \times Iout}{(n+1)Vdd \times Iout} \times 100 = \frac{Vout}{(n+1)Vdd} \times 100 \quad \text{(Equation 4)}$$

As described above, according to the charge pump circuit, each of the diodes is used as a charge transfer device and charges are successively transferred to a next stage to perform boosting.

However, in order to easily realize mounting on a MOS integrated circuit, a MOS transistor rather than the diode of a pn junction is used because of process compatibility. Therefore, the use of the MOS transistor instead of the diode as the charge transfer device has been proposed. In this case, Vd in Expression 1 corresponds to a threshold value Vth of the MOS transistor.

Figure 5:
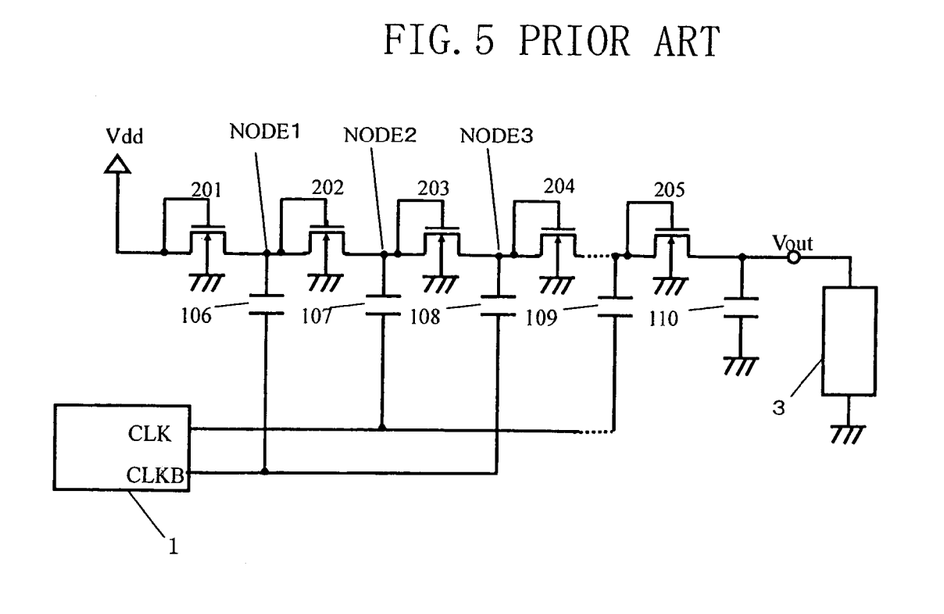
FIG. 5 is a circuit diagram showing a charge pump circuit using a MOS transistor as a charge transfer element of the circuit shown in FIG. 4.

FIG. 5 is a circuit diagram showing a charge pump circuit using the MOS transistor MOS transistor as the charge transfer device instead of the diode. In FIG. 5, n N-type MOS transistors 201 to 205 each having a drain and a gate connected with the same node, are connected in series. A structure is employed in which nodes, each of which is connected with the adjacent N-type MOS transistors, are connected with one ends of the coupling capacitors 106 to 109, and the clock pulses CLK and CLKB whose phases are reversed to each other are applied to the other ends of the respective coupling capacitors. When the input voltage Vin is applied to a connection point between the drain of the N-type MOS transistor 202 and a coupling capacitor 206 through the N-type MOS transistor 201 to successively transfer charges from the coupling capacitor 106 to the coupling capacitor 109, Vout which is a boosted voltage higher than the input voltage Vin is outputted from the N-type MOS transistor 205. The capacitor indicated by reference numeral 110 is the output capacitor. Here, assume that a set of the N-type MOS transistor 202 and the coupling capacitor 106 is a first-stage boosting unit, a node related to the set is set as a node-1, the number of boosting units in a boosting circuit is the number of stages of the boosting circuit, and a boosting unit which is composed of the N-type MOS transistor 205 and a coupling capacitor 209 is an nth-stage boosting unit. Hereinafter, the circuit operation of a conventional charge pump circuit using N-type MOS transistors for charge transfer will be described.

When the clock pulse CLKB is in an L (low) level, a potential at the node-1 is increased by a current I1 and charging is made up to (VDD-Vth0-Vthb0) in view of a threshold value Vth0 of the N-type MOS transistor 201. Here, Vthb0 indicates a component of a variation of the threshold value of the N-type MOS transistor 201 which is caused by a substrate effect. After that, when the clock pulse CLKB is changed to an H (high) level, the potential at the node-1 increases. An increased potential Vup at this time can be expressed by Expression 5 in the case where Cnode 1 indicates a parasitic capacitance at the node-1.

$$Vup = Vdd \times \frac{C1}{C1 + Cnode1} \quad \text{(Equation 5)}$$

Therefore, the voltage V1 at the node-1 which is obtained after one-stage boosting is expressed by the following expression.

$$V1 = (Vdd - Vth0 - Vthb0) + Vup \quad \text{(Equation 6)}$$

At this time, CLK is in an L (low) level, a voltage at a second-stage node-2 decreases. Here, when the following condition is held, charges are transferred from the node-1 to the node-2, so a current I2 flows.

$$V2 - V1 > Vth1 + Vthb1 \quad \text{(Equation 7)}$$

Then, a potential at a node-N2 is increased to a potential expressed by the following expression by the current I2.

$$V2 = V1 - Vth1 + Vthb1 \quad \text{(Equation 8)}$$

After that, when the clock pulse CLK is changed to an H (high) level, the potential at the node-2 is increased to a high voltage by capacitor coupling to transfer the charges from the node-2 to a node-3 based on the same operation principle as that described above, with the result a potential at the node-3 increases. Therefore, boosting is performed such that, while the operation for transferring charges to a next-stage node after the charges are sufficiently stored in a coupling capacitor is repeated, the charges are successively transferred from the first-stage N-type MOS transistor 201 to the final-stage N-type MOS transistor 205 to increase a voltage with the shift to a subsequent block node. Then, a high voltage is obtained as a voltage of the source of the final-stage N-type MOS transistor 205, that is, the output voltage Vout. However, in a conventional charge pump circuit, the threshold voltage Vth is increased by the substrate effect on each of the charge transfer MOS transistors 201 to 205, thereby reducing the power efficiency.

Figure 6:
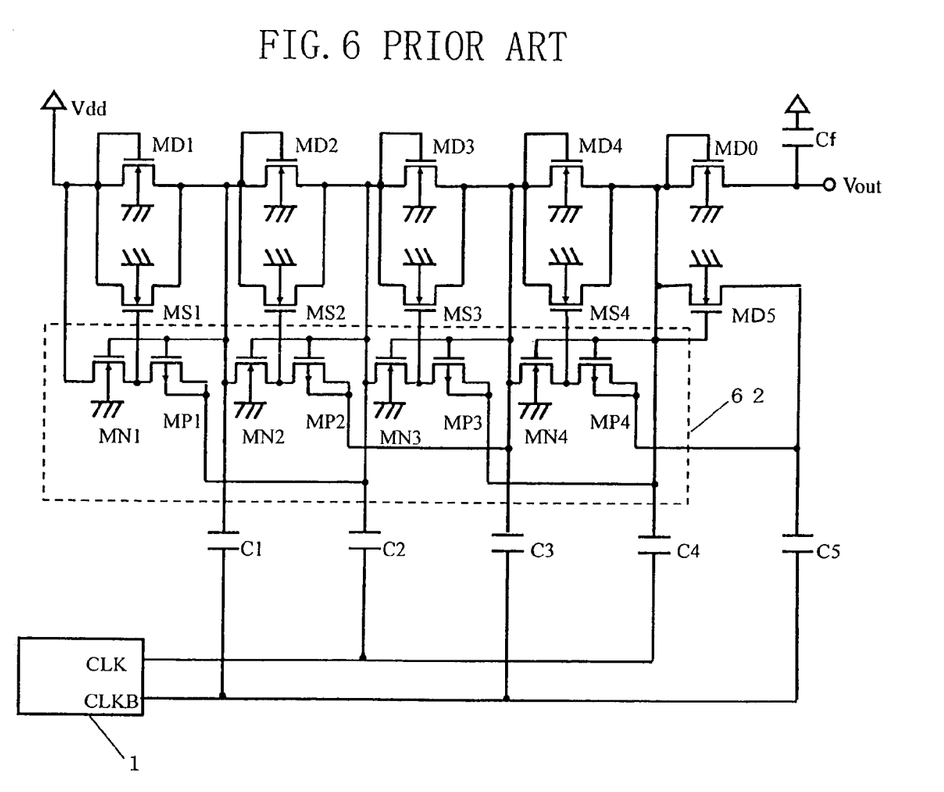
FIG. 6 is a diagram showing a conventional dynamic charge pump circuit.

FIG. 6 shows a dynamic charge pump circuit by which the above-mentioned problem has been solved (see, for example, Jieh-Tsorng Wu, "*MOS Charge Pumps for Low Voltage Operation*", *IEEE Journal of Solid-State Circuits* Vol. 33, No. 4. April 1998). Each of MOS transistors MD1 to MD4 corresponds to an initial setting diode for each pumping mode and thus does not act for a pumping operation. This circuit is a boot-strap high-voltage clock generating circuit used to drive MOS transistors MS1 to MS4 at high voltages in order to prevent Vgs of the MOS transistor MD4 from reducing to "Vdd+(Vdd−Vth)" and prevent Vgs of a MOS transistor MD0 from reducing to (Vdd−Vth). The high-voltage clock generating circuit includes N-channel enhancement transistors MN1 to MN4 and P-channel enhancement transistors MP1 to MP4 which compose inverters. Each of the MOS transistors MS1 to MS4 has an N-channel type (see, for example, JP 2002-233134 A However, in the dynamic charge pump circuit shown in FIG. 6, the threshold voltage Vth of each of the N-channel enhancement transistors MN1 to MN4 of a high-voltage clock generating circuit 62 is increased by the substrate effect on the MOS transistors with a shift to a subsequent stage. As a result, the N-channel enhancement transistor MN4 located at the subsequent stage is not turned ON, so a layer short state is caused between the source and the drain of MS4. Then, charges are transferred to a parasitic capacitor and the coupling capacitor C4 which are related to the node located at the drain of MD0, so a parasitic capacitance Cnode increases to reduce the potential Vup, thereby reducing the power efficiency. That is, in the charge pump circuit, as in the case of the circuit operation described with reference to FIG. 6, the operation for transferring charges to a next-stage node after the charges are sufficiently stored in the coupling capacitor is repeated for boosting. Therefore, when MS4 is continuously in an ON state, the charges are transferred to the next stage node with a state in which the charges cannot be sufficiently stored in the coupling capacitor, with the result that there is a problem that the power efficiency reduces. This is because, when the number of boosting unit stages in the charge pump circuit increases and when Vdd becomes higher, an increase in threshold voltage Vth which is caused by the substrate effect cannot be neglected, thereby reducing boosting efficiency.

SUMMARY OF THE INVENTION

In order to solve the above-mentioned problem, according to the charge pump circuit in the present invention, an N-channel depletion transistor is used as an N-channel transistor included in an inverter of a high-voltage clock generating circuit.

According to the charge pump circuit in the present invention, a P-channel enhancement transistor is used as a charge transfer device.

According to the charge pump circuit in the present invention, a circuit for limiting a voltage inputted to the charge pump circuit is used.

According to the charge pump circuit in the present invention, the N-channel depletion transistor is used as the N-channel transistor included in the inverter of the high-voltage clock generating circuit of the charge pump circuit, so a reduction in power efficiency due to the increase of Vth which is caused by the substrate effect can be suppressed. Even when the number of boosting unit stages in the charge pump circuit increases, the power efficiency does not reduce.

The P-channel enhancement transistor is used as the charge transfer device, so the reduction in power efficiency due to the increase of Vth which is caused by the substrate effect can be eliminated. Therefore, there is an effect that the reduction in power efficiency can be suppressed as the number of boosting unit stages in the charge pump circuit increases.

The circuit for limiting the voltage inputted to the charge pump circuit to prevent the inputted voltage from becoming too large is used, the reduction in power efficiency which is caused by a parasitic bipolar operation can be prevented. Therefore, there is an effect that the boosting operation can be realized in a wide input voltage range.

DETAILED DESCRIPTION OF THE PREFERRED EMBODIMENTS

Preferred Embodiment 1

Figure 1:
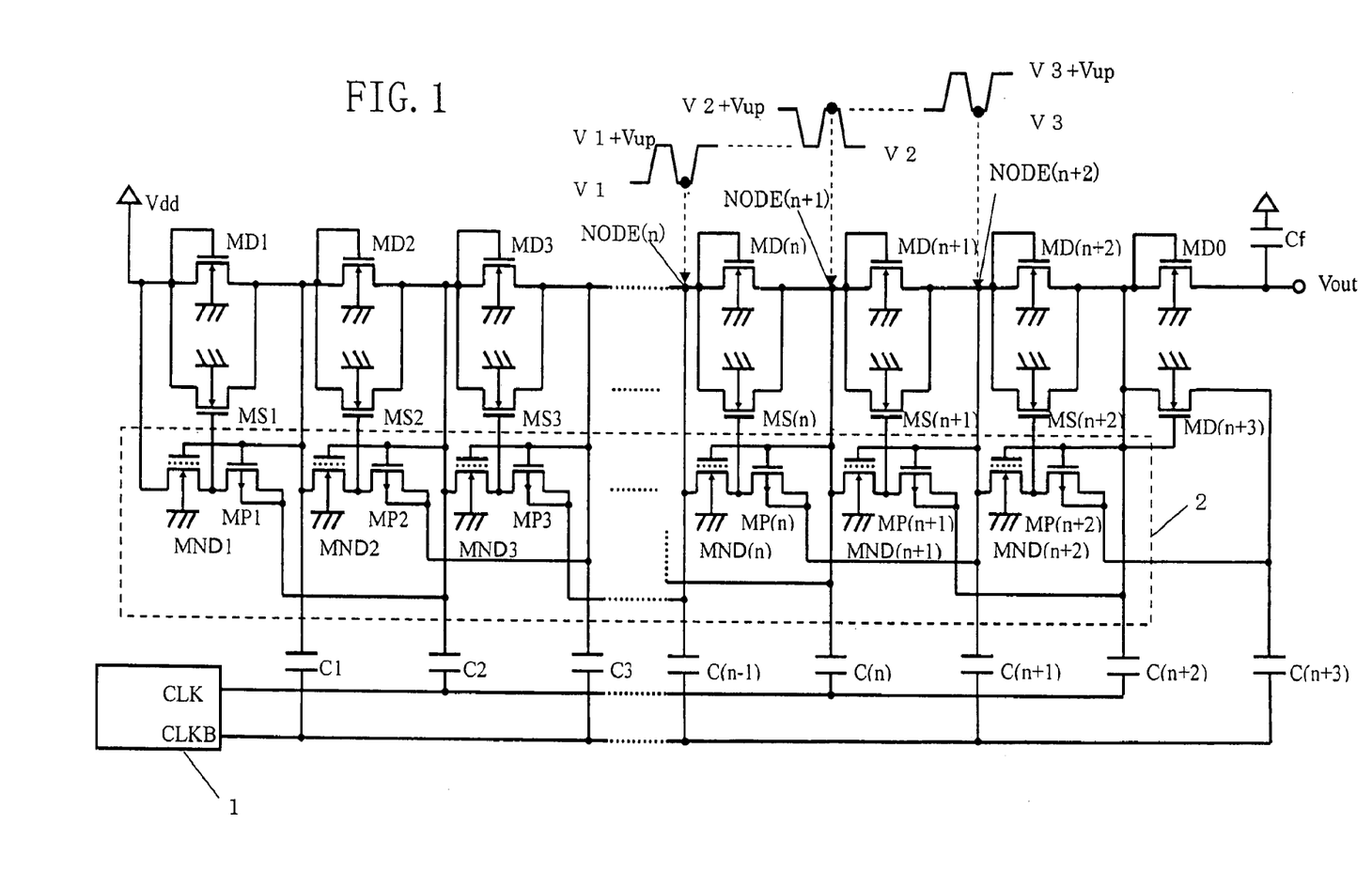
FIG. 1 is a circuit diagram showing a dynamic charge pump circuit according to a first embodiment of the present invention.

FIG. 1 is a circuit diagram showing a dynamic charge pump circuit according to a first embodiment of the present invention. The dynamic charge pump circuit shown in FIG. 1 includes MOS transistors MD1 to MD(n+2) which serve as initial setting diodes for pumping modes, MOS transistors MS1 to MS(n+2) connected in series with the MOS transistors MD1 to MD(n+2), a boot-strap high-voltage clock generating circuit 2 for driving the MOS transistors MS1 to MS(n+2) at high voltages, coupling capacitors C1 to C(n−2), and a clock driver 1 for supplying clocks to the coupling capacitors C1 to C(n−2). The high-voltage clock generating circuit 2 includes N-channel depletion transistors MND1 to MND(n+2) and P-channel enhancement transistors MP1 to MP(n+2). Each set of those composes an inverter. A gate of each of the N-channel enhancement transistors MS1 to MS(n+2) serving as charge transfer devices is controlled based on an output of the inverter.

Assume that a set of the MD(n) drain and the coupling capacitor C(n−1) is a unit and a corresponding node is a node-(n). In the same way, a node-(n+1) and a node-(n+2) are assumed. Here, a circuit operation at a timing when a potential at the node-(n) is V1 will described. In this case, a potential at the node-(n+1) is V2+Vup (=V1+2Vup) and a potential at the node-(n+2) is V3 (=V2+Vup=V1+2Vup). In other words, When an inverter composed of MND(n) and MP(n) is assumed, the potential V1 is applied to a source of MND(n) and the potential V1+2Vup is applied to each of a source of MP(n), a gate of MND(n), and a gate of MP(n). In an ideal case, the potential V1 is applied to an output of the inverter which is connected with the gate of MS(n) to turn OFF MS(n). However, because of the substrate effect on MND (n), in order to certainly output the potential V1 from the inverter, a condition related to a relationship between a threshold voltage of MND(n) and a gate voltage thereof as expressed below is required.

$$V2+Vup(\text{Gate voltage of } MND(n))>V1+Vtnd+Vthb0$$
$$(\text{Threshold voltage of } MND(n)) \quad \text{(Equation 9)}$$

Here, Vtnd indicates the threshold voltage of MND(n) and Vthb0 indicates a component of a variation in threshold value which is by the substrate effect on MND(n). In view of "V2+Vup=V1+2Vup", when Expression 9 is developed, $$2Vup>Vtnd+Vthb0 \quad \text{(Equation 10)}$$

When Vthb0 is increased by the substrate effect not to satisfy Expression 10, charges are transferred to a next-stage node with a state in which the charges cannot be sufficiently stored in the coupling capacitor, with the result that the power efficiency reduces.

In general, when the threshold value of the N-channel enhancement transistor is expressed by Vtn, Vtnd<Vtn. Therefore, in order to hold Expression 10, there is an advantage to use an N-channel depletion transistor whose threshold is lower as the N-channel transistor included in the inverter of the high-voltage clock generating circuit.

Preferred Embodiment 2

Figure 2:
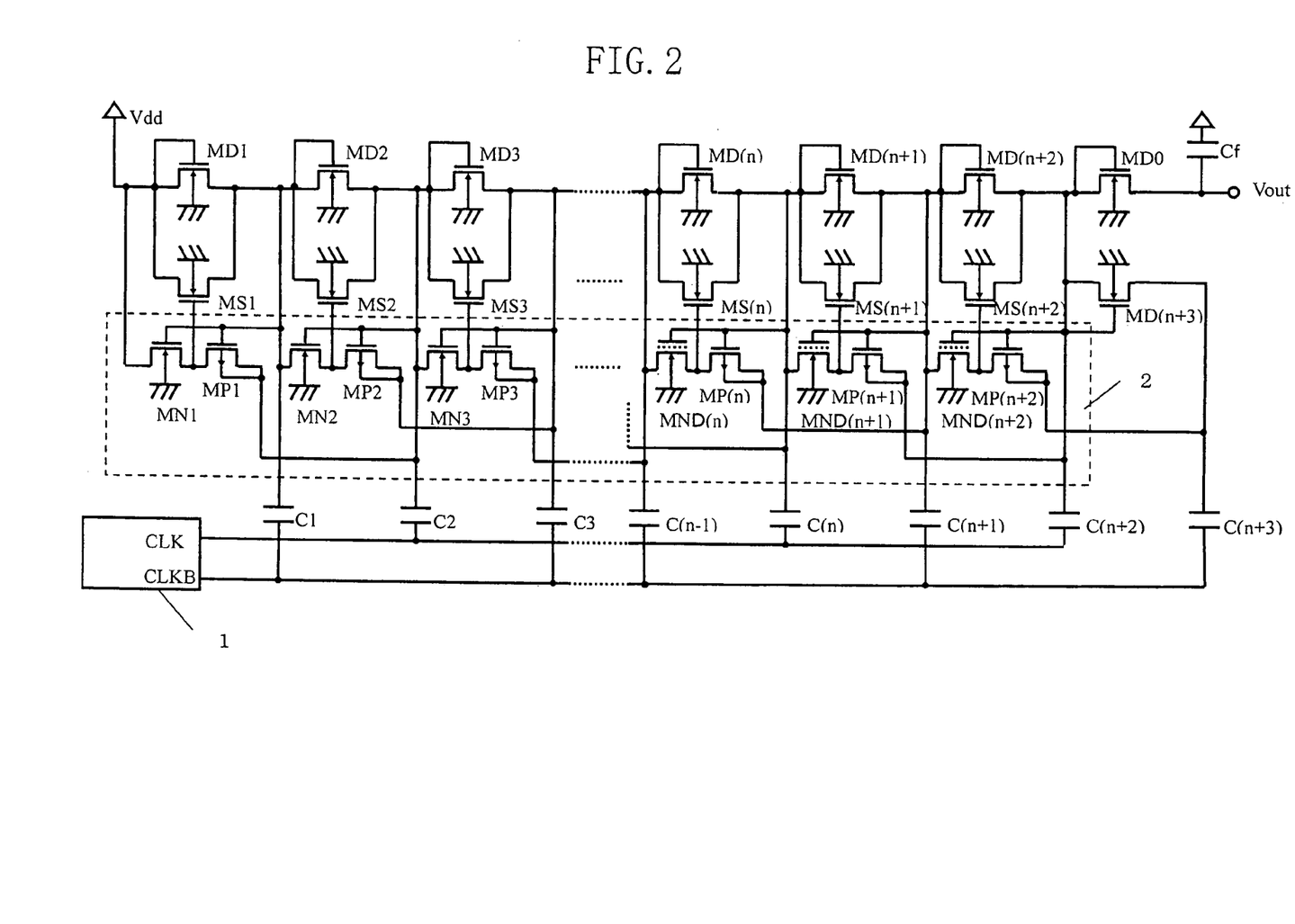
FIG. 2 is a circuit diagram showing a dynamic charge pump circuit according to a second embodiment of the present invention.

FIG. 2 is a circuit diagram showing a dynamic charge pump circuit according to a second embodiment of the present invention. A point different from the charge pump circuit shown in FIG. 1 is that the N-channel enhancement transistors MN1 to MN3 are used for inverters controlling boosting units located at first several stages in the high-voltage clock generating circuit.

In a design rule of a semiconductor layout design, a minimum set transistor size of the N-channel enhancement transistor is normally smaller than that of the N-channel depletion transistor. Therefore, N-channel enhancement transistors, each of which has a small transistor size, are used for the boosting units located at first several stages in which the influence of an increase in threshold value which is caused by the substrate effect is small. N-channel depletion transistors are used for boosting units located at subsequent stages in which the influence of the increase in threshold value which is caused by the substrate effect is large. When the transistor size reduces, a circuit area is narrowed as compared with that of the circuit described in Embodiment 1 and the parasitic capacitance Cnode becomes smaller. Therefore, Vup increases, so a reduction in voltage efficiency can be suppressed.

Preferred Embodiment 3

Figure 3:
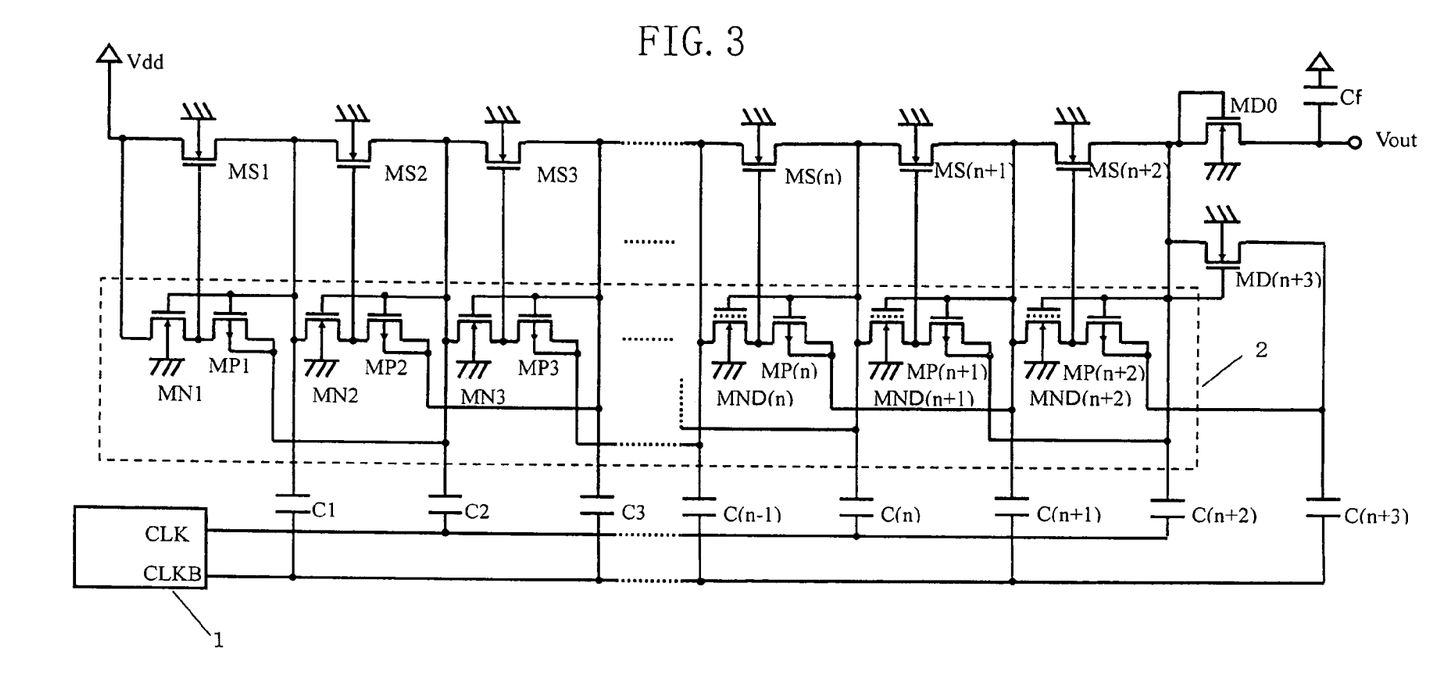
FIG. 3 is a circuit diagram showing a dynamic charge pump circuit according to a third embodiment of the present invention.

FIG. 3 is a circuit diagram showing a dynamic charge pump circuit according to a third embodiment of the present invention. A point different from the charge pump circuit shown in FIG. 2 is that the initial setting diodes MD1 to MD(n+2) are omitted. Therefore, the circuit area is narrowed as compared with that of the circuit described in Embodiment 2 and the parasitic capacitance Cnode becomes smaller. Thus, Vup increases, so the reduction in voltage efficiency can be suppressed.

Preferred Embodiment 4

Figure 7:
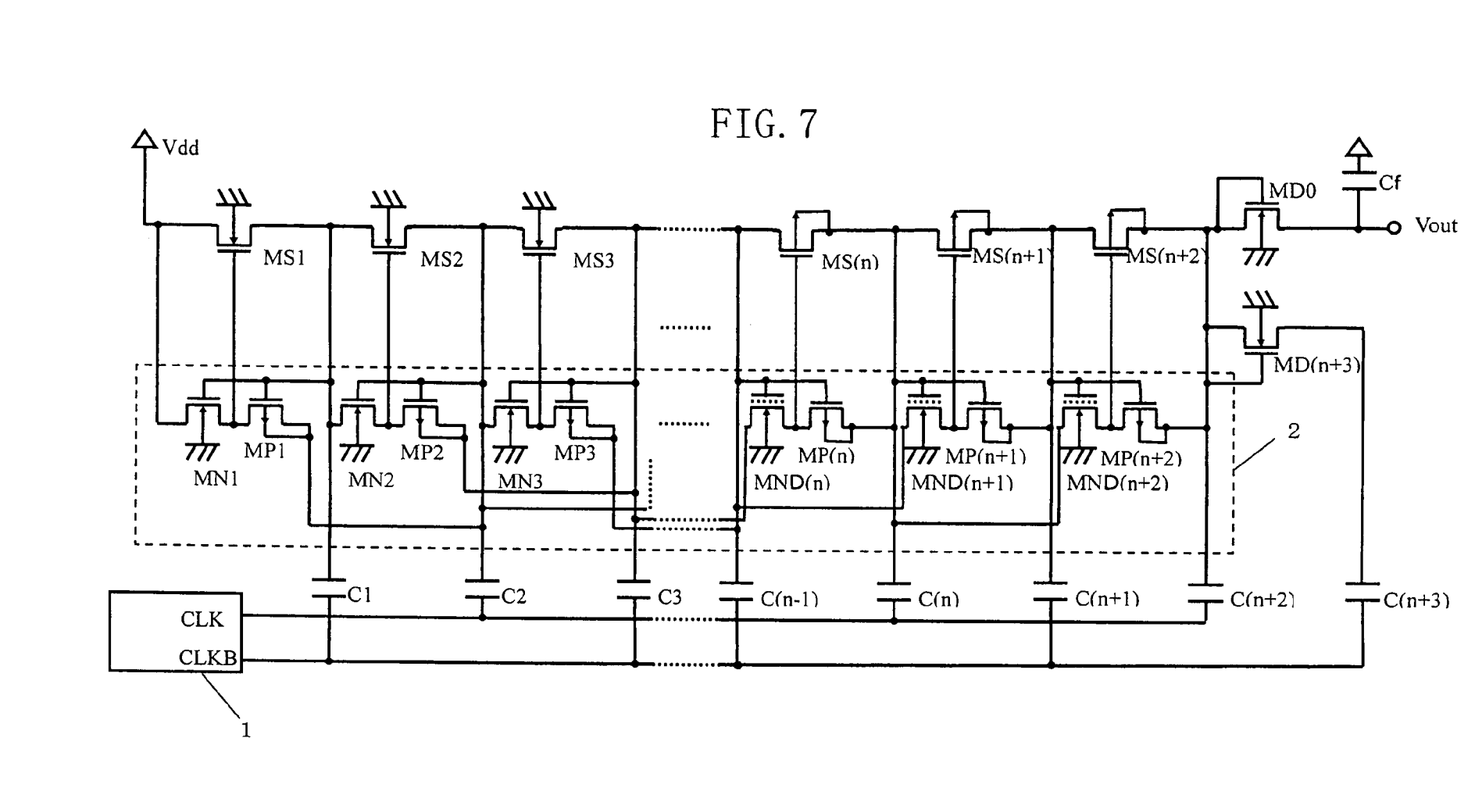
FIG. 7 is a circuit diagram showing a dynamic charge pump circuit according to a fourth embodiment of the present invention.

FIG. 7 is a circuit diagram showing a dynamic charge pump circuit according to a fourth embodiment of the present invention. A point different from the charge pump circuit shown in FIG. 3 is that P-channel enhancement transistors are used for the charge transfer devices MS(n) to MS(n+2) located at subsequent stages and wirings of the inverters in the high-voltage clock generating circuit are changed to turn on/off gates of the P-channel enhancement transistors.

For example, in order to turn on the charge transfer device MS(n+1), the N-channel depletion transistor MND(n+1) is turned on such that the gate of the charge transfer device MS(n+1) becomes a potential of the coupling capacitor C(n−1). In order to turn off the charge transfer device MS(n+1), a P-channel enhancement transistor MP(n+1) is turned on such that the gate of the charge transfer device MS(n+1) becomes a potential of the coupling capacitor C(n+1). An effect in the case where the N-channel depletion transistor MND is used for the inverter of the high-voltage clock generating circuit is the same as that in the case of FIG. 3.

Therefore, the influence of the increase in threshold value which is caused by the substrate effect can be eliminated by boosting units located at an nth-stage and subsequent stages. Thus, when the number of boosting unit stages in the charge pump circuit increases, the reduction in power efficiency can be suppressed.

Preferred Embodiment 5

Figure 8:
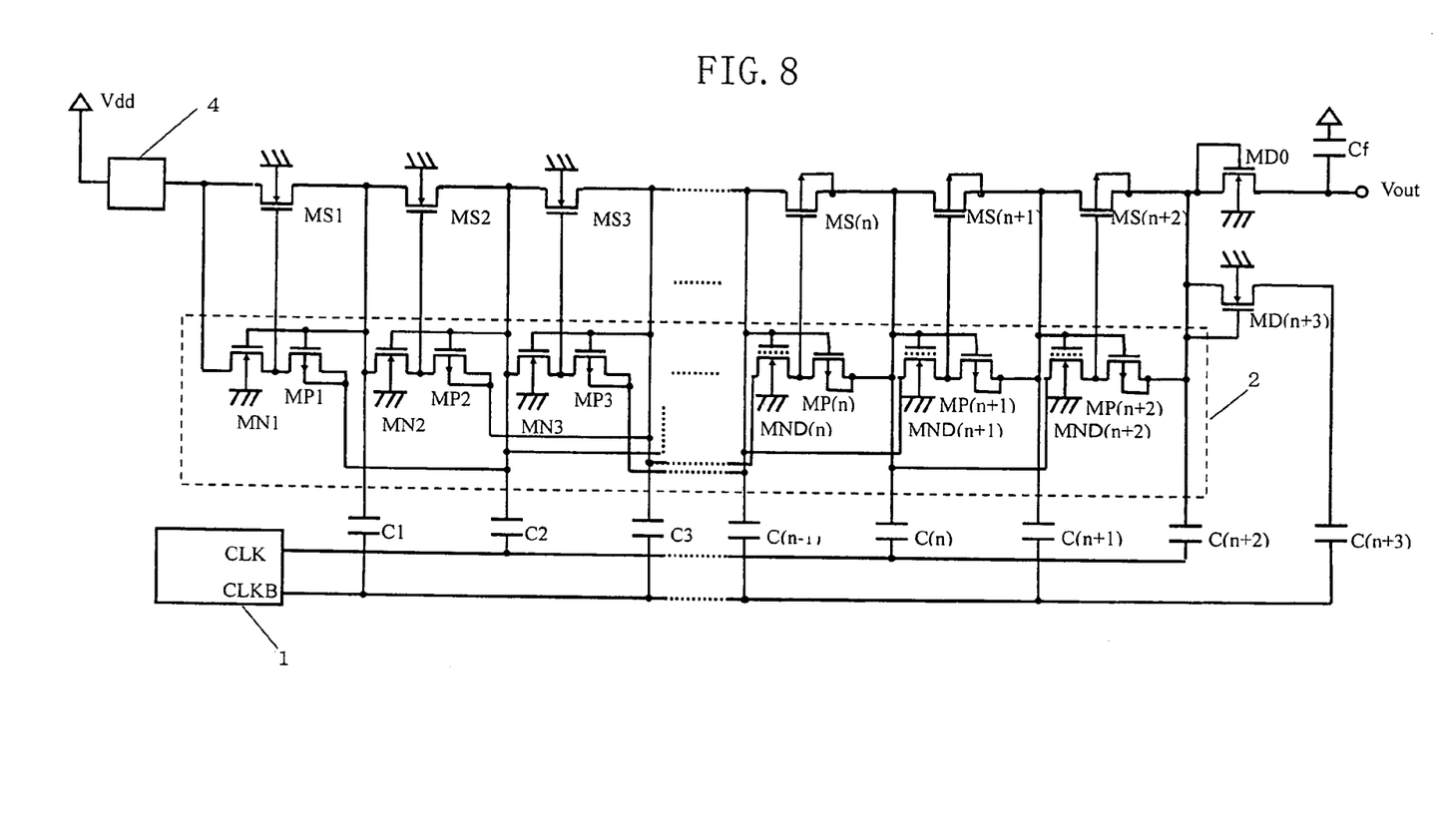
FIG. 8 is a circuit diagram showing a dynamic charge pump circuit according to a fifth embodiment of the present invention.

FIG. 8 is a circuit diagram showing a dynamic charge pump circuit according to a fifth embodiment of the present invention. A point different from the charge pump circuit shown in FIG. 7 is that an input voltage limiting circuit 4 is provided between the power source voltage Vdd input and the charge pump circuit in order to prevent the voltage inputted to the charge pump circuit from becoming too large.

The input voltage limiting circuit 4 is provided on the input side of the charge pump circuit to prevent a boosting voltage per boosting stage from becoming too large. Therefore, the reduction in power efficiency which is caused by a parasitic bipolar operation can be prevented. Thus, the boosting operation can be realized in a wide input voltage range.

The parasitic bipolar is, for example, a PNP element formed among a drain P of the charge transfer device MS(n), a substrate N of the charge transfer device MS(n), and a substrate P of an IC. When a voltage of the substrate N of the charge transfer device MS(n) relative to that of the drain P of the charge transfer device MS(n) is temporarily reduced to a predetermined voltage or less by a pumping operation at the time of boosting, a parasitic bipolar current flows to the substrate P of the IC which has a low potential. The parasitic bipolar current naturally causes a reduction in boosting efficiency. Therefore, the circuit for limiting the boosting voltage per stage, that is, the voltage inputted to the charge pump circuit is used so as not to reduce the voltage of the substrate N of the charge transfer device MS(n) relative to that of the drain P of the charge transfer device MS(n) to the predetermined voltage or less, thereby preventing the parasitic bipolar operation.

A circuit structure of the input voltage limiting circuit 4 is not limited. A voltage regulator for generating a constant voltage in the case of, for example, a predetermined power source voltage or more, is preferable. Therefore, even when the power source voltage Vdd becomes larger, the bipolar operation does not occur, so the charge pump circuit according to the present invention can realize the boosting operation in a wide power source voltage range.

What is claimed is:

1. A charge pump circuit, comprising:
   charge transfer transistors connected in series between a voltage input terminal and a voltage output terminal;
   coupling capacitors each having one terminal connected with a connection point between the adjacent charge transfer transistors;
   a clock generating circuit for alternately inputting clocks whose phases are reversed to each other to the other terminals of the coupling capacitors; and
   inverters, each of which includes an N-channel depletion transistor and a P-channel enhancement transistor, for controlling gates of the charge transfer transistors based on signals at the one terminals of the coupling capacitors.

2. A charge pump circuit according to claim 1, wherein each of the charge transfer transistors comprises an N-channel enhancement transistor.

3. A charge pump circuit according to claim 2, wherein each of charge transfer transistors located at an nth-stage, in which n is an integer equal to or larger than 2, and subsequent stages comprises a P-channel enhancement transistor.

4. A charge pump circuit according to claim 1, wherein each of inverters located at an mth-stage, in which m is an integer equal to or larger than 2, and stages previous thereto comprises an N-channel enhancement transistor and a P-channel enhancement transistor.

5. A charge pump circuit according to claim 1, further comprising an input voltage limiting circuit for limiting an input voltage, which is provided on an input side of a charge transfer transistor located at a first stage.

* * * * *